US008626495B2

(12) United States Patent
Boldt et al.

(10) Patent No.: US 8,626,495 B2
(45) Date of Patent: *Jan. 7, 2014

(54) METHOD OF CORRECTING ERRORS IN BINARY MASKS

(75) Inventors: Jesper Bünsow Boldt, Smørum (DK); Ulrik Kjems, Smørum (DK); Michael Syskind Pedersen, Smørum (DK); Mads Graesbøll Christensen, Klarup (DK); Søren Holdt Jensen, Gistrup (DK)

(73) Assignee: Oticon A/S, Smorum (DK)

( * ) Notice: Subject to any disclaimer, the term of this patent is extended or adjusted under 35 U.S.C. 154(b) by 567 days.

This patent is subject to a terminal disclaimer.

(21) Appl. No.: 12/850,439

(22) Filed: Aug. 4, 2010

(65) Prior Publication Data

US 2011/0051948 A1 Mar. 3, 2011

Related U.S. Application Data

(60) Provisional application No. 61/237,109, filed on Aug. 26, 2009.

(30) Foreign Application Priority Data

Aug. 26, 2009 (EP) .................................... 09168699

(51) Int. Cl.
*G10L 19/00* (2013.01)
(52) U.S. Cl.
USPC ........ 704/200.1; 704/200; 704/206; 704/210; 704/222; 704/226
(58) Field of Classification Search
USPC .......... 702/190, 191; 704/231, 233, 226, 200, 704/200.1, 206, 210, 222
See application file for complete search history.

(56) References Cited

U.S. PATENT DOCUMENTS

2004/0002858 A1 1/2004 Attias et al.
2006/0056647 A1 3/2006 Ramakrishnan et al.
(Continued)

FOREIGN PATENT DOCUMENTS

WO WO 2006/000103 A1 1/2006

OTHER PUBLICATIONS

Srinivasan S.; DeLiang Wang, Transforming Binary Uncertainties for Robust Speech Recognition, Sep. 2007, IEEE, vol. 15, pp. 2130-2140.*

(Continued)

*Primary Examiner* — Qi Han
(74) *Attorney, Agent, or Firm* — Birch, Stewart, Kolasch & Birch, LLP (57) ABSTRACT

The invention relates to a method of identifying and correcting errors in a noisy binary mask. An object of the present invention is to provide a scheme for improving a binary mask representing speech. The problem is solved in that the method comprises a) providing a noisy binary mask comprising a binary representation of the power density of an acoustic signal comprising a target signal and a noise signal at a predefined number of discrete frequencies and a number of discrete time instances; b) providing a statistical model of a clean binary mask representing the power density of the target signal; and c) using the statistical model to detect and correct errors in the noisy binary mask. This has the advantage of providing an alternative and relatively simple way of improving an estimate of a binary mask representing a speech signal. The invention may e.g. be used for speech processing, e.g. in a hearing instrument.

27 Claims, 5 Drawing Sheets

(56) References Cited

U.S. PATENT DOCUMENTS

| | | | |
|---|---|---|---|
| 2007/0055508 A1* | 3/2007 | Zhao et al. | 704/226 |
| 2008/0101653 A1* | 5/2008 | Wang | 382/103 |
| 2009/0006038 A1* | 1/2009 | Jojic et al. | 702/190 |
| 2010/0135511 A1* | 6/2010 | Pontoppidan | 381/313 |
| 2010/0262423 A1* | 10/2010 | Huo et al. | 704/233 |
| 2011/0046948 A1* | 2/2011 | Pedersen | 704/231 |

OTHER PUBLICATIONS

DeLiang Wang, Time-Frequency Masking for Speech Separation and Its Potential for Hearing Aid Design, 2008, Trends in Amplification, vol. 12 No. 4, pp. 332-353.*

Aarthi M. Reddy; Bhiksha Raj, Soft Mask Estimation for Single Channel Speaker Separation, 2004, ISCA Tutorial and Research Workshop on Statistical and Perceptual Audio Processing.*

Yang Shao;DeLiang Wang, Robust Speaker Recognition Using Binary Time-Frequency Masks, 2006, IEEE, vol. 1, p. 1-4.*

Martin Cooke; Phil Green; Ljubomir Josifovski; Ascension Vizinho, Robust automatic speech recognition with missing and unreliable acoustic data, 2001, Speech Communication, vol. 34, pp. 267-285.*

Deliang Wang, on ideal binary mask as the computational goal of auditory scene analysis, 2005, Speech Separation by Humans and Machines, pp. 181-197.*

Reyes-Gomez M.J.;Raj, B.; Ellis D.R.W., Multi-channel source separation by factorial HMMs, 2003, IEEE, vol. 1, pp. 1-4.*

Sebastien Demange; Christophe Cerisara; Jean-Paul Haton, Missing data mask estimation with frequency and temporal dependencies, january 2009, Computer Speech and Language archive, vol. 23 Issue 1, pp. 25-41.*

Raphael Bornard;Emmanuelle Lecan;Louis Laborelli;Jean-Hugues Chenot, Missing data correction in still images and image sequences, 2002, Proceedings of the tenth ACM international conference on Multimedia, pp. 355-361.*

Ji Hun Park; Jae Sam Yoon; Hong Kook Kim, HMM-Based Mask Estimation for a Speech Recognition Front-End Using Computational Auditory Scene Analysis, 2008, IEEE, pp. 176-179.*

Tao Li, A general model for clustering binary data, 2005, Florida International University, pp. 188-197.*

Rabiner L.R., A Tutorial on Hidden Markov Models and Selected Applications in Speech Recognition, 1989, IEEE, vol. 77 Issue 2, pp. 257-286.*

J. C. C Segura; A. De La Torre; M. C. Benitez; A. M. Peinado, Model-based compensation of the additive noise for continuous speech recognition. Experiments using the Aurora Ii database and tasks, 2001, Eurospeech Scandinavia, pp. 1-4.*

Barker, J. et al. "Robust ASR Based on Clean Speech Models: An Evaluation of Missing Data Techniques for Connected Digit Recognition in Noise". Eurospeech 2001, Sep. 2001, pp. 1-4, XP007004804.

Li, N. et al. "Factors influencing intelligibility of ideal binary-masked speech: Implications for noise reduction", J. Acoust. Soc. Am. vol. 123, No. 3, Mar. 2008. pp. 1673-1682. XP002570521.

Shao, Y. et al. "Sequential organization of speech in computational auditory scene analysis", Elsevier Science Publishers, Speech Communication vol. 51, No. 8, 2009, pp. 657-667.

Srinivasan, S. et al. "Binary and ratio time-frequency masks for robust speech recognition", Speech Communication, Elsevier Science Publishers, vol. 48, No. 11, 2006 pp. 1486-1501. XP025056863.

* cited by examiner

METHOD OF CORRECTING ERRORS IN BINARY MASKS

CROSS REFERENCE TO RELATED APPLICATIONS

This nonprovisional application claims the benefit of U.S. Provisional Application No. 61/237,109 filed on Aug. 26, 2009 and to European Patent Application No. 09168699.8 filed on Aug. 26, 2009. The entire contents of all of the above applications are hereby incorporated by reference into the present application.

TECHNICAL FIELD

The present invention relates to signal processing. The invention relates specifically to a method of identifying and correcting errors in a noisy binary mask. The invention further relates to a data processing system, to a computer readable medium and to a hearing instrument.

The invention may e.g. be useful in applications such as speech processing.

BACKGROUND ART

The following account of the prior art relates to one of the areas of application of the present invention, hearing aids.

Ideal binary masks have shown to be able to increase speech intelligibility significantly. The term "ideal" is used because knowledge about the clean target speech or clean noise signal must be available in order to calculate the ideal binary masks. In many applications only the noisy speech is available making it difficult to fulfil this requirement. Different concepts of 'the ideal binary mask' are e.g. discussed in [Wang, 2005] and [Kjems et al., 2009]. Calculating the binary masks using noisy speech instead of clean speech introduces errors in the binary masks. The present application relates to a method for correcting these errors.

DISCLOSURE OF INVENTION

The general idea is to use a statistical model to identify errors in a binary mask, e.g. representing noisy speech, and to calculate the probability for the units in the binary mask being correct. The statistical model can e.g. be based on a Hidden Markov Model (HMM) (cf. e.g. [Rabiner, 1989]) or Dynamic Time Warping (DTW) (cf. e.g. [Sakoe et al., 1978]), which is trained on binary masks from clean signals (e.g. speech) and possibly from noisy signals (e.g. speech in noise).

The term 'clean signal' (e.g. 'clean speech') is used to indicate the target (e.g. speech) signal alone without any additional (noise) signals. The term 'noisy signal' (e.g. 'noisy speech') is used to describe a (clean) target (e.g. speech) signal mixed with one or more other signals (termed noise).

Trying to correct errors in the binary domain can reduce the complexity of a processing algorithm compared to more traditional methods working on the waveforms or using a time-frequency representation of the noisy signal (e.g. speech). However, the greatly reduced (binary) domain does also make an upper limit on what can be achieved by this method. In the present work, the target binary mask (cf. [Kjems et al., 2009]) is used, but the method can potentially be used on all kinds of binary masks or other binary patterns.

An object of the present invention is to provide a scheme for improving a binary mask representing speech (in noise). Other objects are to provide a scheme for improving a binary mask representing other signals or patterns, e.g. optical signals, e.g. in connection with character recognition.

Objects of the invention are achieved by the invention described in the accompanying claims and as described in the following.

An object of the invention is achieved by a method of identifying and correcting errors in a noisy binary mask. The method comprises a) providing a noisy binary mask comprising a binary representation of the power density of a signal, e.g. an acoustic signal, comprising a target signal mixed with a noise signal at a predefined number of discrete frequencies and a number of discrete time instances;

b) providing a statistical model of a clean binary mask representing the power density of the target signal; and c) using the statistical model to detect and correct errors in the noisy binary mask.

The method provides an alternative and relatively simple way of improving an estimate of a binary mask representing a signal (e.g. a speech signal). In an embodiment, the noisy binary mask represents (target) speech in noise. In other embodiments, the binary mask to be improved may represent any other appropriate signal pattern. In an embodiment, the binary mask represents images, e.g. images of characters to be improved in an optical character recognition (OCR) process.

The term 'a noisy binary mask' is used to indicate a binary mask determined from a noisy target signal.

The statistical model can in general be of any kind appropriate for pattern recognition and comparison. In a particular embodiment, the statistical model is based on Hidden Markov Models.

In a particular embodiment, the step of providing a statistical model comprises providing a training set of a clean binary mask comprising a binary representation of power density of the target signal at the predefined number of discrete frequencies and a number of discrete time instances.

In a particular embodiment, the step of providing a statistical model comprises providing a training set of a noisy binary mask comprising a binary representation of the power density of the target signal mixed with a noise signal at the predefined number of discrete frequencies and a number of discrete time instances.

In a particular embodiment, the statistical model comprises states and observations and wherein the states are constituted by vectors representing the target signal in the binary domain at the predefined number of discrete frequencies at a number of points in time, and wherein the observations are constituted by binary vectors representing the target signal mixed with the noise signal at the predefined number of discrete frequencies at a number of points in time.

In a particular embodiment, each state is constituted by a binary vector $Q_t$ representative of the target signal at the predefined number of discrete frequencies at a given point in time t.

In a particular embodiment, the method provides that for each state $Q_t$ a corresponding observation $X_t$ is constituted by a vector comprising the probability of a one for each of the predefined number of discrete frequencies, given the state in question.

In a particular embodiment, the method provides that the state transition probabilities defining a probability of changing from state $Q_t$ to $Q_{t+1}$ are provided, and e.g. arranged in a square matrix A with size N×N, where N is the total number of states and where the matrix element at the $m^{th}$ row and $n^{th}$ column in the matrix represents the probability of changing from state m to state n.

In a particular embodiment, the observation probabilities are arranged in a matrix B with size F×N, where F is the number of frequencies and N is the total number of states and where the matrix element at the $p^{th}$ row and $q^{th}$ column in the matrix represents the probability of a one at the $p^{th}$ frequency of the $q^{th}$ state.

In a particular embodiment, the method comprises a quantization of the clean binary mask wherein a subset of $N_q$ states are determined, where $N_q$<N, each state being constituted by a binary mode vector representative of the target signal at the predefined number of discrete frequencies. Preferably, the number $N_q$ of states are selected so as to represent the clean binary mask with a minimum of errors. For a given number of states $N_q$, the optimal binary mode vectors can e.g. be determined by the K-Means algorithm cf. e.g. [Li, 2005].

In a particular embodiment, the state transition probabilities $a_{ij}$ of the matrix A are calculated from the quantized binary mask by counting the number $n_{ij}$ of state changes Qi to Qj, where i=1, 2, . . . , $N_q$ and j=1, 2, . . . , $N_q$ and divide each number $n_{ij}$ by the total number $N_{sc,i}$ of state changes of the quantized binary mask from state i. In other words, calculate $a_{ij}=n_{ij}/N_{sc,i}$, where $$\sum_{j=1}^{N_q} n_{ij} = N_{sc,i}, \text{ so } a_{ij} = \frac{n_{ij}}{\sum_{j=1}^{N_q} n_{ij}}.$$

Consequently, $$\sum_{j=1}^{N_q} a_{ij} = 1.$$

In a particular embodiment, the observation probabilities B(k,n) of the matrix B are calculated based on two contributions $B_c$ and $b_n$ according to the formula $B(k,n)=B_c(k,n)+b_n(k)-B_c(k,n)\cdot b_n(k)$, where k=1, 2, . . . , F is the frequency index and n=1, 2, . . . , $N_q$ is the state index, where $B_n(k,n)$ are the observation probabilities defined by the clean binary mask and the quantized clean binary mask, and where the observation probabilities $b_n(k)$ defining the probability of ones at each frequency generated by the noise signal.

In a particular embodiment, the observation probabilities $b_n(k)$ are calculated from characteristics of the of the noise signal in question.

In a particular embodiment, the observation probabilities $b_n(k)$ are calculated during time periods where no voice signals are present (e.g. using a voice detector to detect such periods). In an embodiment, this is done in a particular training phase of the statistical model prior to an operational use of the method (e.g. in a hearing instrument). In an embodiment, this is done during operational use of the method, either instead of doing it in a particular training phase or as a supplement or update of the probabilities determined during such training phase.

Instead of using a voice detector, the determination of time units where only noise is present can alternatively be made as discussed by [Martin, 2001].

In a particular embodiment, the target binary mask $TBM_{est}$ is estimated from the following formula:

$$TBM_{est} = TB\widehat{M(\tau,k)} = \begin{cases} 1; \text{ if } \frac{T(\tau,k)+M(\tau,k)}{BTH(k)} > 1 \\ 0; \text{ otherwise,} \end{cases}$$

where $T(\tau,k)$ is the power of the target sound, $M(\tau,k)$ is the power of the masker sound, and $BTH(k)$ is a threshold value, e.g. the long-term average spectrum of the target sound, and $\tau$ and k are time and frequency indices, respectively. The masker sound may be any sound that is considered as noise with respect to the target sound. The terms 'target sound' and 'target signal' are used interchangeably. Similarly, the terms 'masker sound' and 'masker signal' and 'noise signal' are used interchangeably.

In a particular embodiment, the observation probabilities $b_n(k)$ are calculated based on a recordal of the noise signal alone. In an embodiment the observation probabilities $b_n(k)$ are calculated based on a binary mask determined as indicated by the formula above without any target signal T present (using only the recorded noise or masker signal M) with a threshold BTH determined from the target signal (e.g. a long term average), cf. also FIG. 1.

In an embodiment, preliminary observation probabilities $b_n(k)$ are calculated based on a recordal of the noise signal alone prior to the use of the statistical model and updated during use (e.g. in a hearing instrument), e.g. by calculating observation probabilities $b_n(k)$ during time periods where no voice signals are present.

In an embodiment, the method comprises a step of normalization. Normalization involves e.g. adjusting the threshold to the target voice. This has the advantage of making a binary mask that is more generic (so that for example the binary masks for different voices become more alike).

In a particular embodiment, an estimate of a noise-free (or a less noisy) binary mask is determined from the noisy binary mask as the most probable sequence of states (e.g. the most probable clean binary mask) using the Viterbi algorithm (cf. e.g. [Rabiner, 1989]).

In a particular embodiment, the most probable sequence of states is calculated based on a number of past, the present, and a number of future observations (e.g. from the noisy binary masks). The more observations considered the more complex processing needs. The use of future observations introduces a processing delay.

A tangible computer-readable medium storing a computer program comprising program code means for causing a data processing system to perform at least some (such as a majority or all) of the steps of the method described above, in the detailed description of 'mode(s) for carrying out the invention' and in the claims, when said computer program is executed on the data processing system is furthermore provided. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A data processing system comprising a processor and program code means for causing the processor to perform at least some (such as a majority or all) of the steps of the method described above, in the detailed description of 'mode(s) for carrying out the invention' and in the claims is furthermore provided.

In an aspect, a hearing instrument or other audio device comprising a data processing system as described above in the detailed description of 'mode(s) for carrying out the invention' and in the claims is furthermore provided. In an embodiment, a hearing instrument comprises a forward path comprising an input transducer for receiving an external acoustic input from the environment, an AD-converter, a processing part implementing said data processing system including for providing time to time-frequency conversion and back, and typically for adapting the signal to the needs of a wearer of the hearing instrument (e.g. by applying a customized frequency dependent gain), a DA-converter (optional) and an output transducer for generating an output perceivable to a wearer of the hearing instrument or other audio device as a sound. In an embodiment, the output transducer comprises one or more speakers for a conventional hearing instrument or other audio device, electrodes for a cochlear implant or vibrators for a bone conduction device for presenting an estimate of an input sound to one or more user's.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which:

FIG. 6 shows the influence of the number of states $N_q$ of the model on the number of wrong ones (W1) and wrong zeros (W0) for a given weighting of the quantization, FIG. 6a being based on data from FIG. 3(C), and FIGS. 5(A), (B), (C) with $N_q$ between 16 and 64, FIG. 6b presenting results for a larger range of states.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

The Target Binary Mask

The target binary mask (TBM) is e.g. obtained by comparing the energy of the time-frequency representation of the target sound with a frequency dependent threshold (BTH). The comparison is done for each unit in the time-frequency (T-F) representation. If the energy of the target sound exceeds that of the noise sound, the particular T-F unit is marked with a one in the binary mask and otherwise zero. Ones in the binary mask represent regions in time and frequency that should be kept. Instead of comparing the target sound with the noise sound, the comparison can be done directly using the threshold value BTH(k):

$$TBM(\tau, k) = \begin{cases} 1; \text{if } \frac{T(\tau, k)}{BTH(k)} > 1 \\ 0; \text{otherwise} \end{cases} \quad (1)$$

where $T(\tau,k)$ is the power of the target sound, BTH(k) is a threshold value, e.g. the long-term average spectrum of the target sound (e.g. obtained as the time averaged spectrum for one speaker or the time averaged spectrum extracted from a multitude of speakers), $\tau$ is a time index, and k is a frequency index. The threshold value controls the number of ones in the TBM. A high threshold value gives a very sparse mask with few ones, whereas a low threshold value gives a very dense mask with many ones. The target binary mask has been shown to be able to increase speech intelligibility significantly when applied to noisy speech [Kjems et al., 2009].

Figure 1:
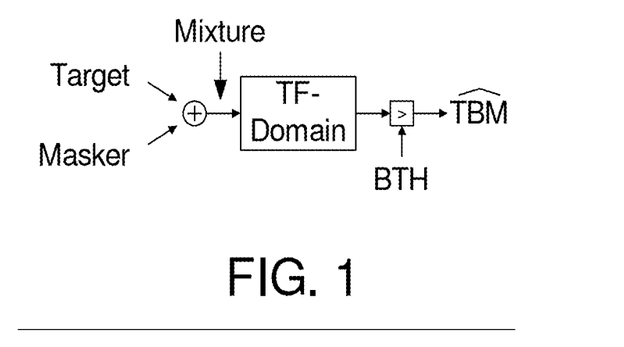
FIG. 1 illustrates an exemplary method for calculating the target binary mask (TBM), by comparing the mixture with the threshold value BTH(k), e.g. the long-term average spectrum of the target $LTAS_\tau(k)$.

In an embodiment, the threshold value BTH(k) is dependent on the long-term average spectrum (LTAS) of the target signal. The long-term average spectrum (LTAS) of a speech signal can e.g. be obtained by identifying time units where only noise is present (e.g. during periods of silence (no speech)), e.g. using a voice detector, estimating the noise level in the various frequency bands, and subtracting the estimated noise levels in a given time unit from the preceding time-frequency units comprising speech (e.g. assuming that the noise level is constant between the identified silent time units). The thus noise-corrected speech containing time units can then be averaged over time to provide a frequency dependent (time-invariant) LTAS(k). The determination of time units where only noise is present can alternatively be made as discussed by [Martin, 2001]. Alternatively, the long-term average spectrum of a speech signal can be determined as discussed in [Byrne et al., 1994], Estimation of the TBM:

FIG. 1 illustrates an exemplary method for calculating the target binary mask (TBM), by comparing the mixture with the threshold value BTH(k), e.g. the long-term average spectrum of the target $LTAS_\tau(k)$.

If no masker (noise) sound is present, the target binary mask can be estimated ($TBM_{est}$ or ("TBM"("τ,k"))) without errors using the block diagram shown in FIG. 1. If a masker sound is present, Equation 1 changes to $$\overline{TBM(\tau,k)} = \begin{cases} 1; \text{if } \frac{T(\tau,k) + M(\tau,k)}{BTH(k)} > 1 \\ 0; \text{otherwise} \end{cases} \quad (2)$$

where M(τ,k) is the power of the masker sound, if we assume that the two signals are uncorrelated. Preferably, the target and masker signals are uncorrelated. Obviously, the masker sound will introduce errors in the TBM depending on the energy of the masker signal. The masker signal M(τ,k) can represent one or more different noise types, e.g. other speakers, babble noise, reverberation, environmental noise, or algorithm noise. The noise can be of a stationary or a time variant nature. In connection with the determination of the target binary mask, stationary noise is preferably dealt with by adjusting the threshold BTH used in creating an estimate of the target binary mask $TBM_{est}$ (e.g. by adjusting the BTH relative to an estimate of the stationary part of the noise), whereas time variant noise is dealt with by the error correction algorithm (working on the $TBM_{est}$).

Figure 8:
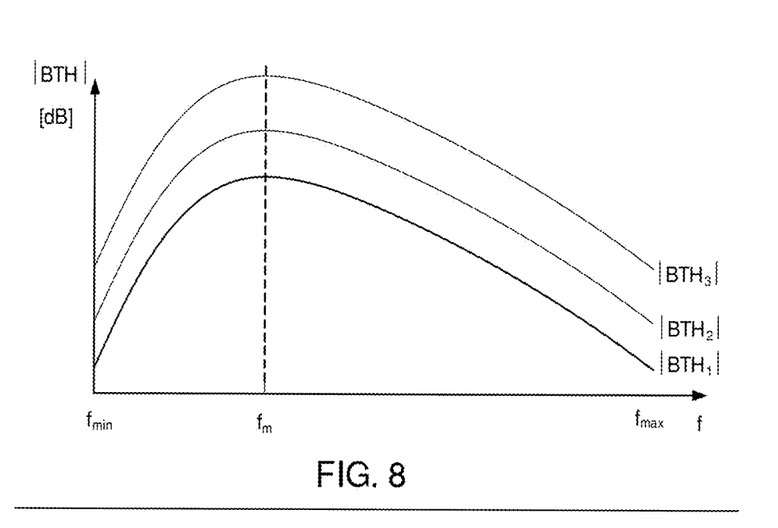
FIG. 8 shows an example of the frequency dependence of a threshold value BTH(k) for use in the estimation of the target binary mask.

FIG. 8 shows an example of the frequency dependence of a threshold value BTH(k) for use in the estimation of the target binary mask. The graph schematically illustrates the frequency dependence between a minimum and a maximum frequency ($f_{min}$, $f_{max}$) of the magnitude of exemplary threshold values $BTH_1$, $BTH_2$, $BTH_3$ for calculating a target binary mask TBN(τ,k), cf. e.g. formula (1) or (2) above (cf. also FIG. 1). The different threshold values $BTH_i$ can be used to control the number of ones in the target binary mask. Preferably, they differ from each other only by a (frequency-independent) value ΔBTH (in a logarithmic description). In other words, the different threshold values used in the determination of the target binary mask have the same frequency dependence. In general, the threshold value is relatively high at intermediate frequencies (e.g. between 100 Hz and 2 KHz, such as between 250 Hz and 500 Hz) with a maximum at an intermediate frequency $f_m$ and relatively low outside this intermediate range, cf. e.g. [Byrne et al., 1994]. Preferably, the number of ones in the target binary mask is larger than 7% of the total number of time-frequency units constituting the binary mask. In a particular embodiment, the number of ones in the target binary mask is larger than 10%, such as larger than 15%. In a particular embodiment, the number of ones in the target binary mask is arranged to be in the range from 5% to 20%, such as in the range from 8% to 12%. Preferably, the threshold value BTH is estimated based on the long term average $LTAS_\tau$(k) of the target signal, i.e. an average spectrum of the target signal over time. Typically, an LTAS-value is based on an average of different voices (e.g. comprising male and female voices). In an embodiment, time variant noise is detected (cf. e.g. [Martin, 2001]) and time-frequency units comprising such time variant noise is excluded from the determination of the threshold value BTH. In an embodiment, the BTH value is adapted to a particular persons voice (e.g. to an expected frequent conversation partner of a hearing aid user). The contribution $b_n$ to the observation probabilities matrix B from the masker sound can e.g. be dynamically calculated with a view to the above illustrated frequency dependence of the threshold value BTH(k). For example, in case a low frequency noise source (e.g. background traffic noise, e.g. from cars) is detected during use of the method (e.g. in an audio processing device, such as a hearing instrument, in operation), the $b_n$ values at relatively low frequencies $f_{low}$ can be increased (compared to preset average values) whereas they can be decreased at relatively higher frequencies $f_{high}$. The opposite change of the $b_n$ values can advantageously be made, in case a high frequency noise source (e.g. machine noise) is detected. Relatively low and relatively high frequencies are considered in view of the audio frequency range considered by the application in question, e.g. the human audible frequency range (20 Hz to 20 kHz) or a sub-range thereof.

Error Correction of $TBM_{est}$ Using Hidden Markov Models:

A Hidden Markov Model (HMM) is a statistical model based on a Markov process which is hidden to the observer. In each state of the Markov process an observation is available, and from a sequence of observations it is possible to calculate the most probable state sequence. In the present use, the states in the HMM are the clean TBM (no masker sound) and the observations are the noisy TBM (with masker sound). From the noisy TBM it is possible to calculate the most probable clean TBM within the limitations of the HMM model. Each state in the HMM is a binary column vector with size equal to the number of frequency channels. This binary column vector describes the binary mask in the F frequency channels at time t. The observation vectors have the same size, but instead of binary numbers, the observation vectors have numbers between zero and one with the probability of a one given the state (see FIG. 2).

Figure 2:
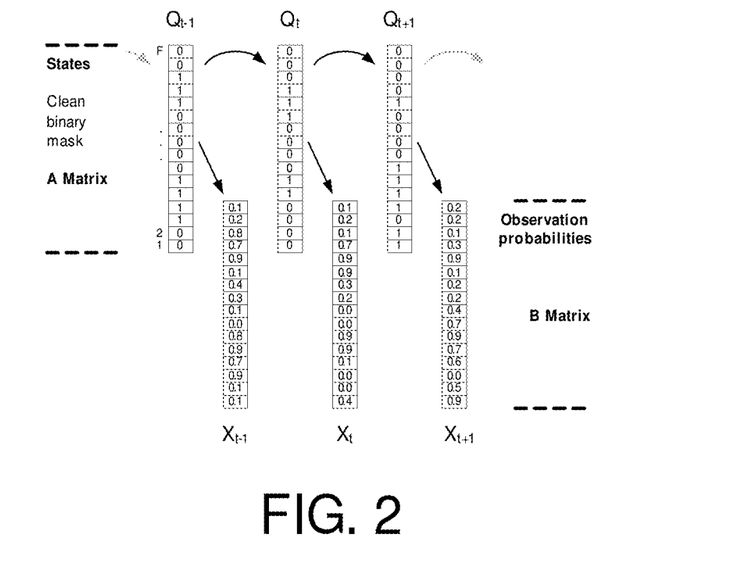
FIG. 2 shows an example of the structure of a Hidden Markov Model comprising states (top part) and observation probabilities in each state (bottom part) at three time instants t−1, t, t+1.

FIG. 2 shows an example of the structure of a Hidden Markov Model comprising states (top part) and observation probabilities in each state (bottom part) at three time instants t−1, t, t+1. The state vectors $Q_{t-1}$, $Q_t$, $Q_{t+1}$ contain the clean binary mask of the target signal. The observation vectors contain $X_{t-1}$, $X_t$, $X_{t+1}$ contain the probability of ones, given the states $Q_{t-1}$, $Q_t$, $Q_{t+1}$, respectively.

This type of HMM is a continuous HMM with discrete observation densities. At each time increment from t to t+1 there is a probability of changing from state $Q_t$ to $Q_{t+1}$. These state transition probabilities are the elements in the matrix A which is a square matrix with size N×N. This matrix describes the probability of changing from one state to another, and the number at the m'th row and n'th column in the matrix is the probability of changing from state m to state n. The observation vectors are arranged in a matrix B called the observation probability with F rows and N columns. Each column in the matrix corresponds to different states and each row corresponds to different frequency channels. The elements in the matrix represent the probability of ones. The last parameter of the HMM is the initial state distribution with the probabilities of starting in the different states. If we restrict the binary mask to start with an all-zero binary column vector, this parameter can be neglected. Potentially, the number of different binary column vectors in the TBM is equal to 2F (and with that an A matrix of size 2F×2F). This is unmanageable, so the number of different binary column vectors must be limited. This is done by finding the $N_q$ binary column vectors, called modes, which best represents the binary mask (cf. FIG. 3 and FIG. 4). The $N_q$ modes are the states of the HMM model and increasing $N_q$ decreases the number of errors introduced by representing the binary mask with the $N_q$ modes/states (cf. FIGS. 5(A), 5(B) and 5(C) and FIG. 6a). The process of representing the binary mask with a limited number of states is referred to as quantization of the binary mask.

EXAMPLE

Figure 3:
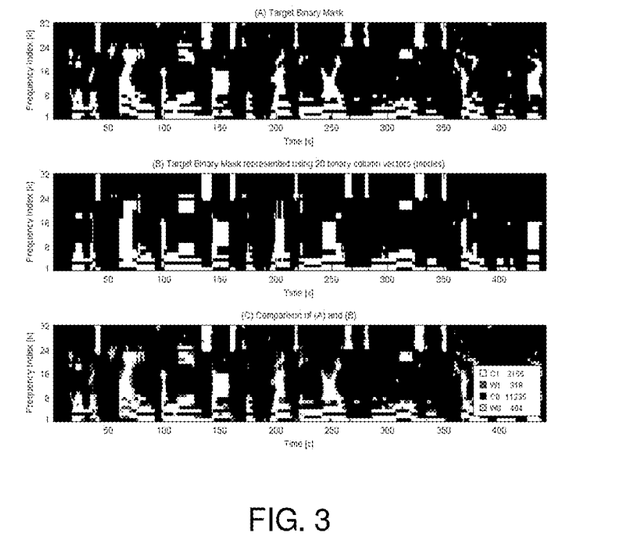
FIG. 3 shows a representation of a target binary mask with a limited number of binary column vectors (modes)
Figure 4:
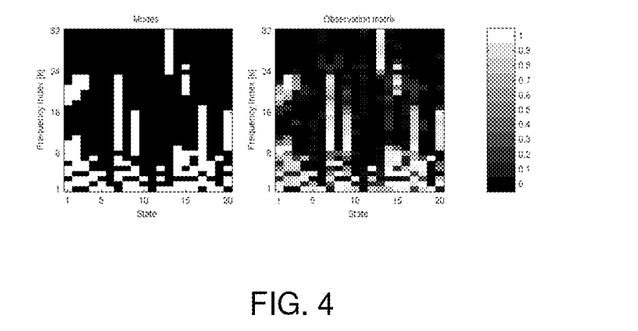
FIG. 4 shows the 20 modes (left) used in FIG. 3(B) and the corresponding observation matrix $B_c$ (right)

FIG. 3 shows a representation of a target binary mask with a limited number of binary column vectors (modes). Each binary mask is in this example represented by F=32 frequency channels (the vertical axis denoted Frequency index [k] and with delimiting indices (channel numbers) 1, 8, 16, 32) and $N_{Total}$=450 time units (the horizontal axis representing time denoted Time [τ] and with delimiting indices 50, 100, 150, 200, 250, 300, 350, 400). The same legend is used in the binary masks shown in FIGS. 5 and 6. In this example, $N_q$=20 modes are used. The image of FIG. 3(A) denoted Target Binary Mask is the original target binary mask, where black units represent zeros and white units represents ones. The image of FIG. 3(B) denoted Target Binary Mask represented using 20 binary column vectors (modes) shows the target mask of FIG. 3(A) represented with 20 modes found using the K-mode algorithm, where again black represents zero and white represents one. The image of FIG. 3(C) denoted Comparison of (A) and (B) shows the errors introduced from (A) to (B), where white is correct ones (C1), dark grey represent wrong ones (W1), black is correct zeros (C0), and light grey represents wrong zeros (W0). The same legend is used in FIGS. 5 and 7. The legend counts the number of units in the four categories yielding 2155 correct ones (C1), 318 wrong ones (W1), 11235 correct zeros (C0) and 404 wrong zeros (W0). In FIG. 4 the 20 modes are shown.

FIG. 4 shows the 20 modes (left) used in FIG. 3(B) and the corresponding observation matrix $B_c$ (right). The left graph shows the 20 modes used to quantize the binary target mask in the form of $N_q$=20 binary vectors $Q_1, Q_2, \ldots, Q_{20}$ each comprising binary values (zero or one) of the vector elements $q_{i1}, q_{i2}, \ldots$, (i=1, 2, ..., 20) at the different frequencies $f_1, f_2, \ldots, f_F$ (F=32 in the example of FIGS. 3, 4, 5, 7). A vector element $q_{ij}$ equal to zero is represented in the left graph by a black element, a one by a white element. When the clean target binary mask of FIG. 3(A) is approximated using only the 20 modes of the left graph of FIG. 4 (denoted Modes) and leading to the mask in FIG. 3(B), each of the 450 column vectors is approximated by a particular one of the $N_q$=20 mode vectors. Each of the 20 mode vectors $Q_r$ (r=1, 2, ..., 20) are used as an approximation for a given number $N_r$ of the $N_{Total}$=450 column vectors $$\left(\sum_{r=1}^{20} N_r = 450\right).$$

The right graph (denoted Observation matrix) graphically illustrates for each of the 20 mode vectors of the left graph the relative number of times $p_{rj}$ (r=1, 2, ..., $N_q$=20, j=1, 2, ..., F=32) a given binary vector element (time-frequency unit) $s_{rj}$ of the clean binary mask deviates from the value $q_{rj}$ in the mode vector $Q_r$, it is approximated to. In other words $p_{rj}=\Delta n_{rj}/N_r$, where $\Delta n_{rj}$ is the absolute number of times the vector element $s_{rj}$ deviates from $q_{rj}$. The right graph thus represents the observation matrix $B_c$ comprising observation probabilities $p_{rj}$ defined by the clean binary mask (FIG. 3(A)) and the quantized clean binary mask (FIG. 3(B)). The observation probabilities are indicated by a corresponding gray scaling. A legend is provided to the right of the graph, a probability of 0 being represented by black, a probability of 1 being represented by white, probabilities between 0 and 1 being indicated in steps of 0.1 by decreasing gray scaling from predominantly black to predominantly white. A fully white time-frequency unit thus indicates that the probability of a correctly estimated 1 is high. The observation probabilities indicate the probability of a 1 in the estimate of the target binary mask in the time-frequency unit in question. A fully black time-frequency unit thus indicates that the probability of a correctly estimated 0 is high. A time-frequency unit having a gray shading midway between black and white (e.g. as indicated by the legend of 0.4-0.6) thus represents a time-frequency unit for which the estimate of the target signal has a low confidence.

Figure 5:
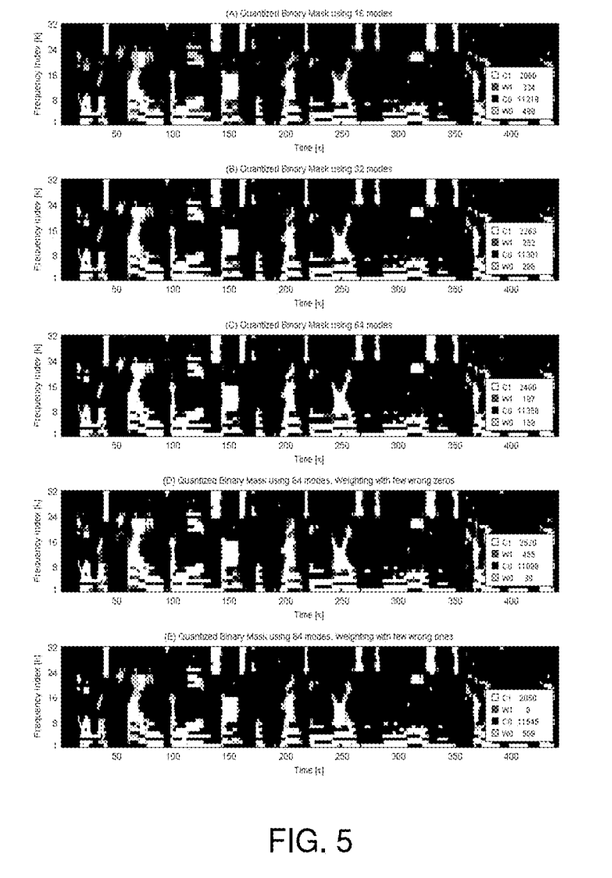
FIG. 5 shows examples of the quantization of the binary mask with different numbers of modes FIGS. 5(A-C) and different weighting of the quantization FIG. 5(C-E)

FIG. 5 shows examples of the quantization of the binary mask with different numbers of modes FIG. 5(A-C) and different weighting of the quantization FIG. 5(C-E).

To find the $N_q$ modes, the K-mode algorithm is used (cf. e.g. [Huang, 1997]). This algorithm is the binary version of the widely used K-means algorithm. The result from using K-mode is $N_q$ binary column vectors which minimizes the error when the binary mask is quantized. The error can be of two types: wrong ones (W1), when correct zeros (C0) are changed to ones, and wrong zeros (W0) when correct ones (C1) are changed to zeros. It is not certain if one type of error is favourable to the other and how the errors will impact sound quality, intelligibility, noise, etc.

FIG. 5(A) denoted Quantized Binary Mask using 16 modes shows the target binary mask of FIG. 3(A) represented by $N_q$=16 modes. This quantization yields 2060 correct ones (C1), 334 wrong ones (W1), 11219 correct zeros (C0) and 499 wrong zeros (W0).

FIG. 5(B) denoted Quantized Binary Mask using 32 modes shows the target binary mask of FIG. 3(A) represented by $N_q$=32 modes. This quantization yields 2263 correct ones (C1), 252 wrong ones (W1), 11301 correct zeros (C0) and 296 wrong zeros (W0).

FIG. 5(C) denoted Quantized Binary Mask using 64 modes shows the target binary mask of FIG. 3(A) represented by $N_q$=64 modes. This quantization yields 2400 correct ones (C1), 197 wrong ones (W1), 11356 correct zeros (C0) and 159 wrong zeros (W0).

Figure 6A:
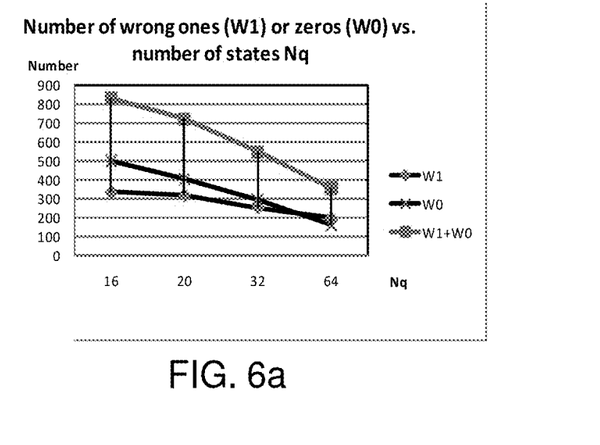

FIG. 6a shows the influence of the number of states of the model on the number of wrong ones (W1) and wrong zeros (W0) for a given weighting of the quantization. In the 16 states model the ratio of wrong to correct ones is W1/C1=334/2060=16%, which decreases to W1/C1=197/2400=8.2% in the 64 states model. Correspondingly, in the 16 states model the ratio of wrong to correct zeros is W0/C0=499/11219=4.4%, which decreases to W0/C0=159/11356=1.4% in the 64 states model. Although the number of wrong ones decreases from 334 to 197 (41%), and the number of wrong ones decreases from 499 to 159 (68%), the improvement in the number of model states from 16 to 64 is relatively modest considering the increase in processing complexity, from handling 16*16 matrices to handling 64*64 matrices.

Figure 6B:
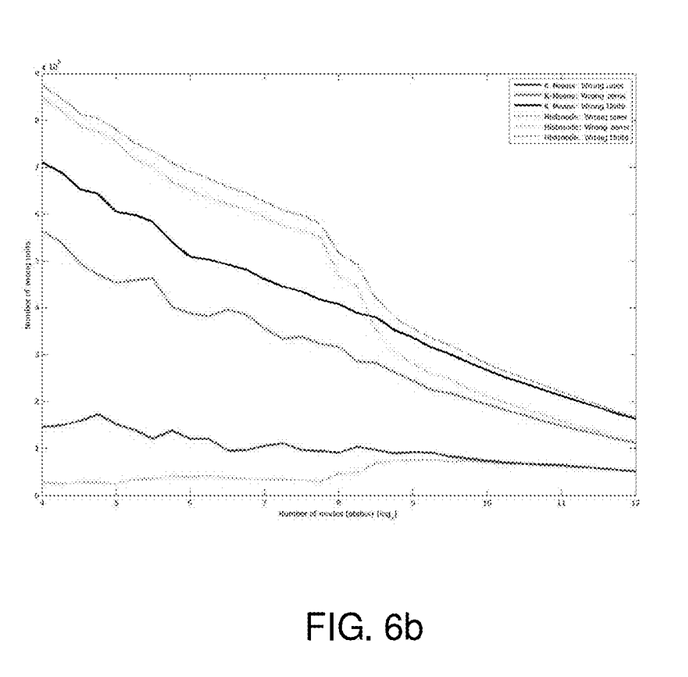

FIG. 6b shows the number of erroneous unit (total wrongs, wrong ones, wrong zeros) vs. the number of modes $N_q$ from 16, 32 to 4096 (i.e. powers of 2 from $2^4$ to $2^{12}$). The vertical axis indicates the number of erroneous units in a range from 0 to $9*10^5$ (linear scale). The horizontal axis indicates the number of states $N_q$ of the statistical model in a range from 4 to 12 (log 2-scale, i.e. corresponding to $N_q=2^4, 2^5, \ldots, 2^{12}$ modes). Graphs W0 indicate wrong zeros. Graphs W1 indicate wrong ones. Graphs W0+W1 indicate the total number of wrong units (wrong zeros plus wrong ones). Data points of the graphs for a particular number of states $N_q$ are determined by 1) using the K-means algorithm to find the $N_q$ most appropriate mode vectors and 2) using the $N_q$ most frequently occurring mode vectors in the target binary mask, respectively, as indicated in FIG. 6b by terms K-means (solid graphs) and Most frequent (dotted graphs), respectively. As expected, the K-means algorithm provides the lowest total number of erroneous units.

In an embodiment, a weighting in the K-mode algorithm accepting wrong ones in favour of wrong zeros or vice versa (FIGS. 3(C), 3(D), and 3(E)) is provided. The weighting in the K-mode algorithm is governed by changing the relative cost of a wrong one compared to a wrong zero.

FIG. 5(D) denoted Quantized Binary Mask using 64 modes. Weighting with few wrong zeros shows the target binary mask of FIG. 3(A) represented by $N_q$=64 modes and a weighting function providing relatively few wrong zeros. This quantization and weighting yields 2520 correct ones (C1), 455 wrong ones (W1), 11098 correct zeros (C0) and 39 wrong zeros (W0).

FIG. 5(E) denoted Quantized Binary Mask using 64 modes. Weighting with few wrong ones shows the target binary mask of FIG. 3(A) represented by $N_q$=64 modes and a weighting function providing relatively few wrong ones. This quantization and weighting yields 2050 correct ones (C1), 8 wrong ones (W1), 11545 correct zeros (C0) and 509 wrong zeros (W0).

An appropriate weighting is dependent on the application. The weighting to choose in a particular situation is a compromise between loss of target units (too many wrong zeros) and too many masker/noise units (too many wrong ones). Too many wrong ones may introduce artefacts in the output signal, whereas too many wrong zeros may reduce the quality of the target signal.

From the quantized binary mask the state transition probability matrix A is calculated by counting the number of state changes. The state transition probabilities $a_{ij}$ of the matrix A are calculated from the quantized binary mask by counting the number $n_{ij}$ of state changes Qi to Qj, where i=1, 2, ..., $N_q$ and j=1, 2, ..., $N_q$ and divide each number $n_{ij}$ by the total number $N_{sc,i}$ of state changes of the quantized binary mask from state i.

To calculate the observation probabilities B, the first step is to compare the quantized binary mask with the original binary mask. If no errors were introduced by the quantization, the columns of the B matrix would be the N modes, but errors are introduced which means that the values in the B matrix are pulled towards 0.5. As an example, consider 10 (cf. $N_r$ above) binary column vectors (cf. $s_{rj}$, j=1, 2, ..., F above) which are quantized to the same mode (r). In 3 (cf. $\Delta n_{r5}$ above) of the 10 binary column vectors, a one is found in row 5 (i.e. in element $s_{r5}$ of the quantized mask), which are lost due to the quantization. This means that the observation vector belonging to the mode will have a value of 3/10 in row 5 ($p_{r5}=\Delta n_{r5}/N_r=0.3$ in the above notation).

The observation probabilities B calculated by comparing the original binary mask with the quantized binary mask is termed $B_c$ (c for clean). The second step to calculate the observation probabilities matrix B is the contribution from the masker sound or noise termed $b_n$. This contribution is independent of $B_c$ and the states (assuming independence of the two sources), so $b_n$, is a column vector of size F describing the probability of ones in each frequency band generated by the masker sound (noise).

To calculate the final matrix B, the two contributions are combined:

$$B(k,n)=B_c(k,n)+b_n(k)-B_c(k,n)\cdot b_n(k) \qquad (3)$$

for all k and n, where k=1, 2, ..., F is the frequency index and n=1, 2, ..., $N_q$ is the state index.

To calculate the parameters for the HMM model a training set of clean and noisy binary masks must be available. It is noted that the clean binary masks are only necessary while training the statistical model. After the parameters of the HMM model have been calculated, the most probable sequence of states can be found from the noisy binary mask using the Viterbi algorithm. This sequence is an estimate of the clean binary mask.

In a particular embodiment, the observation probabilities $b_n(k)$ are calculated during time periods where no voice signals are present. In an embodiment the observation probabilities $b_n(k)$ are calculated based on a binary mask determined as indicated by equation (2) above without any target signal T present (using only the recorded noise or masker signal M) with a threshold BTH determined from the target signal (e.g. a long term average), cf. also FIG. 1.

The Viterbi algorithm calculates the most probably states given the past, present and future observations. This means that the algorithm is non-causal and will introduce a delay because we use a look-ahead determined by the number of future observations used in the Viterbi algorithm. If the algorithm should be causal, only the past and present observation can be used to calculate the most probably state. Decreasing the look-ahead will reduce the performance of the algorithm.

Figure 7:
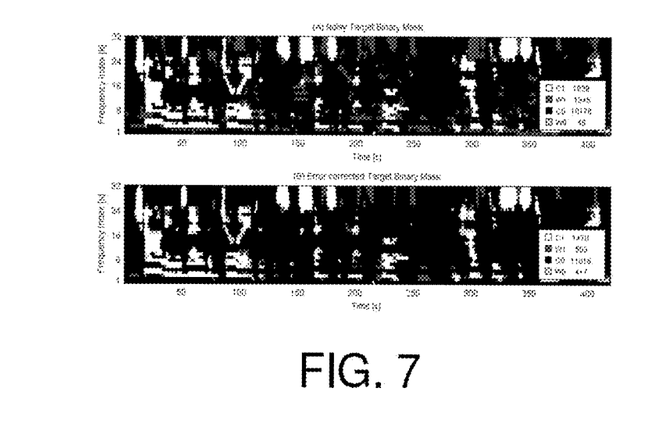
FIG. 7 shows an example of error correction using the HMM model.

FIG. 7 shows an example of error correction using the HMM model.

FIG. 7(A) denoted Noisy Target Binary Mask shows a noisy target binary mask represented by $N_q$=1024 modes. This quantization yields 1839 correct ones (C1), 1345 wrong ones (W1), 10176 correct zeros (C0) and 48 wrong zeros (W0).

FIG. 7(B) denoted Error corrected Target Binary Mask shows the target binary mask resulting from the noisy target binary mask of FIG. 7(A) after being corrected with the method described in the present application. The corrected target binary mask yields 1470 correct ones (C1), 503 wrong ones (W1), 11018 correct zeros (C0) and 417 wrong zeros (W0).

The amount of wrong ones (W1) is reduced from (A) to (B) by 63% ((1345−503)/1345), but at the expense of a decrease in the amount of correct ones (C1) by 20% ((1839−1470)/1839) and an increase in the number of wrong zeros (W0). However, the total number of wrong units (W1+W0) has in the present example decreased by 34% ((1345+48−(503+417))/(1345+48)). In other words, the error corrected mask is significantly closer to the target binary mask than the noisy target binary mask.

The number of 'new' wrong zeros depends on the number of states of the model. The more states, the less wrong zeros are present after error correction.

To summarize, the HMM for binary mask error correction is described by the following parameters:

F, the number of frequency channels (k is a frequency index, 1, 2, ..., F).

$N_q$, the number of states or modes to represent the binary mask (n is a state index, 1, 2, ..., $N_q$). The terms states and modes are used interchangeably in the present application.

A, the state transition probabilities having size $N_q \times N_q$.

B, the observation probabilities with size $F \times N_q$.

π, the initial state distribution.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. The framework of the present invention has been audio processing. It may, however, be used in other signal processing scenarios comprising a clean and a noisy target signal where the clean target signal should be estimated from the noisy target signal, for example clean-up of black and white images (e.g. photos), recognition of hand writing, etc.

REFERENCES

[Wang, 2005] Wang, D. *On ideal binary mask as the computational goal of auditory scene analysis*, Divenyi P (ed): Speech Separation by Humans and Machines, pp. 181-197 (Kluwer, Norwell, Mass., 2005).

[Kjems et al., 2009] Ulrik Kjems, Jesper B. Boldt, Michael S. Pedersen, Thomas Lunner, and DeLang Wang, *Role of mask pattern in intelligibility of ideal binary-masked noisy speech*, JASA (in the press).

[Rabiner, 1989] L. R. Rabiner, A Tutorial on Hidden Markov Models and Selected Applications in Speech Recognition, Proceedings of the IEEE, Vol. 77, No. 2, February 1989, pp. 257-286.

[Sakoe et al., 1978] Hiroaki Sakoe and Seibi Chiba, *Dynamic programming algorithm optimization for spoken word recognition*, IEEE Trans. Acoust., Speech, Signal Processing, Vol. 26, pp. 43-49, February 1978.

[Li, 2005] Tao Li, *A General Model for Clustering Binary Data*, KDD'05, Aug. 21-24, 2005, Chicago, Ill., USA, pp. 188-197.

[Martin, 2001] Rainer Martin, *Noise Power Spectral Density Estimation Based on Optimal Smoothing and Minimum Statistics*, IEEE Transactions on Speech and Audio Processing, Vol. 9, No. 5, July 2001, pp. 501-512.

[Byrne et al., 1994] Dennis Byrne et al., *An international comparison of long-term average speech*, J. Acoust. Soc. Am., Vol. 96, No. 4, October 1994, pp. 2108-2120.

[Huang, 1997] Zhexue Huang, *Clustering large data sets with mixed numeric and categorical values*, in The First Pacific-Asia Conference on Knowledge Discovery and Data Mining, 1997, pp. 21-34.

The invention claimed is:

1. A method of identifying and correcting errors in a noisy binary mask, the method comprising
   a) providing a noisy binary mask comprising a binary representation of the power density of an acoustic signal comprising a target signal mixed with a noise signal at a predefined number of discrete frequencies and a number of discrete time instances;
   b) providing a statistical model of a clean binary mask representing the power density of the target signal; and
   c) using the statistical model by a processor to detect and correct errors in the noisy binary mask.

2. A method according to claim 1 wherein the statistical model is based on Hidden Markov Models.

3. A method according to claim 1 wherein the step of providing a statistical model comprises providing a training set of a clean binary mask comprising a binary representation of power density of the target signal at the predefined number of discrete frequencies and a number of discrete time instances.

4. A method according to claim 1 wherein the step of providing a statistical model comprises providing a training set of a noisy binary mask comprising a binary representation of the power density of a mixture of the target signal and a noise signal at the predefined number of discrete frequencies and a number of discrete time instances.

5. A method according to claim 1 wherein the statistical model comprises states and observations and wherein the states are constituted by vectors representing the target signal at the predefined number of discrete frequencies at a number of points in time, and wherein the observations are constituted by vectors representing the target signal mixed with the noise signal at the predefined number of discrete frequencies at a number of points in time.

6. A method according to claim 5 wherein each state is constituted by a binary vector $Q_t$ representative of the target signal at the predefined number of discrete frequencies in a given time unit t.

7. A method according to claim 5 wherein for each state $Q_t$ a corresponding observation $X_t$ is constituted by a vector comprising the probability of a one for each of the predefined number of discrete frequencies, given the state in question.

8. A method according to claim 7 wherein the observation probabilities are arranged in a matrix B with size F×N, where F is the number of frequencies and N is the total number of states and where the matrix element at the $p^{th}$ row and $q^{th}$ column in the matrix represents the probability of a one at the $p^{th}$ frequency of the $q^{th}$ state.

9. A method according to claim 5, wherein
   state transition probabilities defining a probability of changing from state $Q_t$ to $Q_{t+1}$ are provided, and arranged in a square matrix A with size N×N, where
   N is the total number of states and where the matrix element at the $m^{th}$ row and $n^{th}$ column in the matrix represents the probability of changing from state m to state n.

10. The method according to claim 9, wherein
    state transition probabilities defining a probability of changing from state $Q_t$ to $Q_{t+1}$ are arranged in a square matrix A with size N×N, where N is the total number of states and where the matrix element at the $m^{th}$ row and $n^{th}$ column in the matrix represents the probability of changing from state m to state n.

11. A method according to claim 5 comprising a quantization of the clean binary mask wherein a subset of $N_q$ states are determined, where $N_q < N$, each state being constituted by a binary mode vector representative of the target signal at the predefined number of discrete frequencies.

12. A method according to claim 11 wherein the state transition probabilities $a_{ij}$ of the matrix A are calculated from the quantized binary mask by counting the number $n_{ij}$ of state changes Qi to Qj, where i=1, 2, ..., $N_q$ and j=1, 2, ..., $N_q$ and divide each number $n_{ij}$ by the total number $N_{sc,i}$ of state changes of the quantized binary mask from state i.

13. A method according to claim 11 wherein the observation probabilities B(k,n) of the matrix B are calculated based on two contributions $B_c$ and $b_m$ according to the formula $B(k,n)=B_c(k,n)+b_n(k)-B_c(k,n)\cdot b_n(k)$, where f=1, 2, ..., F is the frequency index and k=1, 2, ..., $N_q$ is the state index, where $B_c(k,n)$ are the observation probabilities defined by the clean binary mask and the quantized clean binary mask, and where the observation probabilities $b_n(k)$ defining the probability of ones at each frequency generated by the noise signal.

14. A method according to claim 13 where the observation probabilities $b_n(k)$ are calculated from characteristics of the of the noise signal in question.

15. A method according to claim 14 where the observation probabilities $b_n(k)$ are calculated during time periods where no voice signals are present.

16. A method according to claim 13, wherein
the observation probabilities are calculated based on a record of the noise signal alone prior to the use of the statistical model to detect and correct errors in the noisy binary mask.

17. A method according to claim 1 wherein
an estimate of a noise-free binary mask is determined from the noisy binary mask as the most probable sequence of states using the Viterbi algorithm,
the states being constituted by vectors representing the target signal in the binary domain at the predefined number of discrete frequencies at a number of points in time.

18. A method according to claim 17 wherein
the most probable sequence of states are calculated based on a number of past, the present, and a number of future observations,
the observations being constituted by binary vectors representing the target signal mixed with the noise signal at the predefined number of discrete frequencies at a number of points in time.

19. A method according to claim 1 wherein
the noisy binary mask represents speech in noise.

20. A method according to claim 1, wherein
a target binary mask $TBM_{est}$ is estimated from the following formula:

$$T\widehat{BM}(\tau,k) = \begin{cases} 1; & \text{if } \frac{T(\tau, k) + M(\tau, k)}{BTH(k)} > 1 \\ 0; & \text{otherwise,} \end{cases}$$

where $T(\tau,k)$ is the power of a target sound, $M(\tau,k)$ is the power of a masker sound, $BTH(k)$ is a threshold value, $\tau$ is a time index, and k is a frequency index.

21. The method according to claim 20, wherein
the threshold value $BTH(k)$ is the long-term average spectrum of the target sound.

22. A non-transitory tangible computer-readable medium storing a computer program comprising instructions for causing a data processing system to perform the steps of the method of claim 1, when said computer program is executed on the data processing system.

23. An audio device, comprising:
a data processing system including a processor configured to perform steps of a method including
providing a noisy binary mask comprising a binary representation of the power density of an acoustic signal comprising a target signal mixed with a noise signal at a predefined number of discrete frequencies and a number of discrete time instances,
providing a statistical model of a clean binary mask representing the power density of the target signal, and
using the statistical model to detect and correct errors in the noisy binary mask; and
a forward path including
an input transducer configured to receive an external acoustic input from an environment and output the acoustic signal,
an AD-converter, and
an output transducer configured to generate an output perceivable to a wearer of the audio device as sound.

24. The audio device according to claim 23, wherein
the output transducer includes one or more speakers for presenting an estimate of the external acoustic input to said wearer.

25. The audio device according to claim 23, wherein
the output transducer includes one or more electrodes implantable in a cochlea for presenting an estimate of the external acoustic input to said wearer.

26. The audio device according to claim 23, wherein
the output transducer includes one or more bone conduction vibrators for presenting an estimate of the external acoustic input to said wearer.

27. The audio device according to claim 23, wherein
the audio device is a hearing instrument, and
the processor is configured to adapt the acoustic signal to needs of the wearer by applying a customized frequency dependent gain to the acoustic signal.

* * * * *